(12) United States Patent
Corbett et al.

(10) Patent No.: US 7,263,629 B2
(45) Date of Patent: Aug. 28, 2007

(54) UNIFORM AND SYMMETRIC DOUBLE FAILURE CORRECTING TECHNIQUE FOR PROTECTING AGAINST TWO DISK FAILURES IN A DISK ARRAY

(75) Inventors: Peter F. Corbett, Lexington, MA (US); Robert M. English, Menlo Park, CA (US); Steven R. Kleiman, Los Altos, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 619 days.

(21) Appl. No.: 10/720,361

(22) Filed: Nov. 24, 2003

(65) Prior Publication Data

US 2005/0114727 A1   May 26, 2005

(51) Int. Cl.
*G06F 11/00*   (2006.01)
(52) U.S. Cl. ........................................... 714/6; 714/770
(58) Field of Classification Search ................ 714/770, 714/6
See application file for complete search history.

(56) References Cited

U.S. PATENT DOCUMENTS

| | | | |
|---|---|---|---|
| 3,876,978 A | 4/1975 | Bossen et al. | |
| 4,092,732 A | 5/1978 | Ouchi | |
| 4,201,976 A | 5/1980 | Patel | |
| 4,205,324 A | 5/1980 | Patel | |
| 4,375,100 A | 2/1983 | Tsuji et al. | |
| 4,467,421 A | 8/1984 | White | |
| 4,517,663 A | 5/1985 | Imazeki et al. | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A | 8/1988 | Clark et al. | |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schillling et al. | |

(Continued)

OTHER PUBLICATIONS

U.S. Appl. No. 10/035,607, filed Dec. 28, 2001, Corbett et al.

(Continued)

*Primary Examiner*—Bryce Bonzo
(74) *Attorney, Agent, or Firm*—Cesari and McKenna LLP (57) ABSTRACT

A uniform and symmetric, double failure-correcting technique protects against two or fewer disk failures in a disk array of a storage system. A RAID system of the storage system generates two disks worth of "redundant" information for storage in the array, wherein the redundant information (e.g., parity) is illustratively derived from computations along both diagonal parity sets ("diagonals") and row parity sets ("rows"). Specifically, the RAID system computes row parity along rows of the array and diagonal parity along diagonals of the array. However, the contents of the redundant (parity) information disks interact such that neither disk contains purely (solely) diagonal or row redundancy information; the redundant information is generated using diagonal parity results in row parity computations (and vice versa).

64 Claims, 6 Drawing Sheets

500

| DISK 0 DATA | DISK 1 PARITY | DISK 2 DATA | DISK 3 PARITY | DISK 4 DATA |
|---|---|---|---|---|
| | 5D | | 6R | |
| | 1D | | 2R | |
| | 7D | | 8R | |
| | 3D | | 4R | |

U.S. PATENT DOCUMENTS

| | | | |
|---|---|---|---|
| 4,870,643 | A | 9/1989 | Bultman et al. |
| 4,899,342 | A | 2/1990 | Potter et al. |
| 4,989,205 | A | 1/1991 | Dunphy, Jr. et al. |
| 4,989,206 | A | 1/1991 | Dunphy, Jr. et al. |
| 5,077,736 | A | 12/1991 | Dunphy, Jr. et al. |
| 5,088,081 | A | 2/1992 | Farr |
| 5,101,492 | A | 3/1992 | Schultz et al. |
| 5,128,810 | A | 7/1992 | Halford |
| 5,148,432 | A | 9/1992 | Gordon et al. |
| RE34,100 | E | 10/1992 | Hartness |
| 5,163,131 | A | 11/1992 | Row et al. |
| 5,166,936 | A | 11/1992 | Ewert et al. |
| 5,179,704 | A | 1/1993 | Jibbe et al. |
| 5,202,979 | A | 4/1993 | Hillis et al. |
| 5,208,813 | A | 5/1993 | Stallmo |
| 5,210,860 | A | 5/1993 | Pfeffer et al. |
| 5,218,689 | A | 6/1993 | Hotle |
| 5,233,618 | A | 8/1993 | Glider et al. |
| 5,235,601 | A | 8/1993 | Stallmo et al. |
| 5,237,658 | A | 8/1993 | Walker et al. |
| 5,257,367 | A | 10/1993 | Goodlander et al. |
| 5,271,012 | A * | 12/1993 | Blaum et al. .................. 714/6 |
| 5,274,799 | A | 12/1993 | Brant et al. |
| 5,305,326 | A | 4/1994 | Solomon et al. |
| 5,351,246 | A | 9/1994 | Blaum et al. |
| 5,410,667 | A | 4/1995 | Belsan et al. |
| 5,537,567 | A | 7/1996 | Galbraith et al. |
| 5,579,475 | A | 11/1996 | Blaum et al. |
| 5,623,595 | A | 4/1997 | Bailey |
| 5,805,788 | A | 9/1998 | Johnson |
| 5,812,753 | A | 9/1998 | Chiariotti |
| 5,862,158 | A | 1/1999 | Baylor et al. |
| 5,884,098 | A | 3/1999 | Mason, Jr. |
| 6,092,215 | A | 7/2000 | Hodges et al. |
| 6,138,201 | A | 10/2000 | Rebalski |
| 6,158,017 | A | 12/2000 | Han et al. |
| 6,223,300 | B1 | 4/2001 | Gotoh |
| 6,532,548 | B1 | 3/2003 | Hughes |
| 6,581,185 | B1 | 6/2003 | Hughes |

OTHER PUBLICATIONS

U.S. Appl. No. 10/700,227, filed Nov. 3, 2003, Kleiman et al.
U.S. Appl. No. 10/720,364, filed Nov. 24, 2003, Corbett et al.
U.S. Appl. No. 10/215,917, filed Aug. 9, 2002, Pawlowski et al.
Patterson, David A., et al., "A Case for Redundant Arrays of Inexpensive Disks (RAID)", Computer Science Division, Department of Electrical Engineering and Computer Sciences, University of California, Berkeley, CA, ACM 1988, pp. 109-116.
Anvin, Peter H, "*The Mathematics of RAID 6,*" Dec. 2004.
Auspex 4Front NS2000, System Architecture, Network-Attached Storage For a New Millennium, Auspex Engineering Technical Report 24, Jan. 1999.
Bestavros, Azer, et al., *Reliability and Performance of Parallel Disks*, Technical Memorandum 45312-891206-01TM, AT&T, Bell Laboratories, Department 45312, Holmdel, NJ, Dec. 1989.
Bitton, Dina, *Disk Shadowing*, Proceedings of the 14$^{th}$ VLDB Conference, LA, CA (1988).
Bultman, David L., *High Performance SCSI Using Parallel Drive Technology*, In Proc. BUSCON Conf., pp. 40-44, Anaheim, CA, Feb. 1988.
Chen, Peter et al., *Two Papers on RAIDs*. Technical Report, CSD-88-479, Computer Science Division, Electrical Engineering and Computer Sciences, University of California at Berkeley (1988).
Chen, Peter M., et al., *An Evaluation of Redundant Arrays of Disks Using an Amdahl 5890*, Performance Evaluation, pp. 74-85, 1990—check to see if exact same copy as one in WAFL.
Chen, Peter M.., et al, Maximizing Performance in a Striped Disk Array, Proc. 1990 *ACM SIGARCH 17th Intern.* Symp. on Comp. Arch., Seattle, WA, May 1990, pp. 322-331.

Chen, Peter M., et al., *RAID:High Performance, Reliable Secondary Storage*, ACM Computing Surveys, 26(2):145-185, Jun. 1994.
Chervenak, Ann L., *Performance Measurement of the First RAID Prototype*, Technical Report UCB/CSD 90/574, Computer Science Division (EECS), University of California, Berkeley, May 1990.
Copeland, George, et al., "*A Comparison of High-Availability Media Recovery techniques,*" in Proc. ACM-SIGMOD Int. Conf. Management of Data, 1989.
Courtright II, William V., et al., *RAIDframe: A Rapid Prototyping Tool for RAID Systems*, Computer Science Technical Report CMU-CS97-142, Carnegie Mellon University, Pittsburgh, PA 15213, Jun. 4, 1997.
Evans *The Tip of the Iceberg:RAMAC Virtual Array—Part I*, Technical Support, Mar. 1997, pp. 1-4.
Gibson, Garth A., et al., *Coding Techniques for Handling Failures in Large Disk Arrays*, Technical Report UCB/CSD 88/477, Computer Science Division, University of California, (Jul. 1988.).
Gibson, Garth A., et al., *Failure Correction Techniques for Large Disk Arrays*, In Proceedings Architectural Support for Programming Languages and Operating Systems, Boston, Apr. 1989, pp. 123-132.
Gibson, Garth A., et al., *Strategic Directions in Storage I/O Issues in Large-Scale Computing*, ACM Computing Survey, 28(4):779-93, Dec. 1996.
Goldick, Jonathan S., et al., *Multi-resident AFS: An Adventure in Mass Storage*, In Proceedings of the 1995 USENIX Technical Conference, pp. 47-58, Jan. 1995.
Graham, Susan L., et al., *Massive Information Storage, Management, and Use*, (NSF Institutional Infrastructure Proposal), Technical Report No. UCB/CSD 89/493, Jan. 1989.
Gray, Jim et al., *Parity striping of disc arrays: Low-Cost Reliable Storage with Acceptable Throughput*. In Proceedings of the 16th Very Large Data Bases Conference, pp. 148-161, Brisbane, Australia, 1990.
Grimes, DW Martinez, *Two Dimensional Parity Error Correction Procedure*, IBM Technical Disclosure Bulletin 2686-2689, Oct. 1982.
Grimes, DW Martinez, *Vertical Parity Generator for Two Dimensional Parity*, IBM Technical Disclosure Bulletin 2682-2685, Oct. 1982.
Hellerstein, Lisa, et al,. *Coding Techniques for Handling Failures in Large Disk Arrays*. In Algorithmica vol. 2, Nr. 3, 182-208 (1994).
Hughes, James, et al., High Performance RAIT, *Tenth NASA Goddard Conference on Mass Storage Systems and Technologies and Nineteenth IEEE Symposium on Mass Storage Systems*, Adelphi, Maryland, USA, Apr. 2002.
Johnson, Theodore, et al, *Tape Group Parity Protection*, IEEE Symposium on Mass Storage, pp. 72-79, Mar. 1999.
Katz, Randy H. et al., *Disk System Architectures for High Performance Computing*, undated.
Kent, Jack et al., Optimizing Shadow Recovery Algorithms, *IEEE Transactions on Software Engineering*, 14(2):155-168, Feb. 1988.
Kim, Michelle Y., *Synchronized Disk Interleaving*, IEEE Transactions on Computers, C-35(11):978-988, Nov. 1986.
Kim, Michelle, et al., *Asynchronous Disk Interleaving Approximating Access Delays*, IEEE Transaction on Computers, vol. 40, No. 7, Jul. 1991 , pp. 801-810.
Lawlor, F. D., *Efficient Mass Storage Parity Recovery Mechanism*, IBM Technical Disclosure Bulletin 24(2):986-987, Jul. 1981.
Lee, Edward K., et al., *RAID-II: A Scalable Storage Architecture for High-Bandwidth Network File Service*, Technical Report UCB/CSD 92/672, (Feb. 1992).
Li, Don, et al., *Authors' Reply*, IEEE Transactions on Communications, 46:575, May 1998.
Livny, Miron, et al., *Multi-Disk Management Algorithms*, In Proceedings of the ACM International Conference on Measurement and Modeling of Computer Systems (SIGMETRICS), pp. 69-77, Banff, Alberta, Canada, May 1987.
Meador, Wes E., *Disk Array Systems*, Proceedings of COMPCON, 1989, pp. 143-146.
Ng, Spencer, et al., *Trade-Offs Between Devices and Paths in Achieving Disk Interleaving*, IEEE International Symposium on Computer Architecture, 1988, pp. 196-201.

Ng, Spencer, *Some Design Issues of Disk Arrays*, Proceedings of COMPCON Spring '89, pp. 137-142. IEEE, 1989.

Park, Arvin, et al., *Providing Fault Tolerance In Parallel Secondary Storage Systems*, Technical Report CS-TR-057-86, Princeton, Nov. 1986.

Patel, Arvind M., *Adaptive Cross-Parity (AXP) Code for a High-Density Magnetic Tape Subsystem*, IBM Technical Disclosure Bulletin 29(6):546-562, Nov. 1985.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Patterson, David A., et al., *Introduction to Redundant Arrays of Inexpensive Disks (RAID)*. In IEEE Spring 89 COMPCON, San Francisco, IEEE Computer Society Press, Feb. 27-Mar. 3, 1989, pp. 112-117.

STORAGESUITE "Performance Without Compromise: The Virtual Storage Architecture,"catalogue, 1997.

Reddy, A. L. Narasimha, et al., *An Evaluation of Multiple-Disk I/O Systems*, IEEE Transactions on Computers, vol. 38, No. 12, Dec. 1989, pp. 1680-1690.

Schulze, Martin E., *Considerations in the Design of a RAID Prototype*, Computer Science Division, Department of Electrical Engineering and Computer Sciences, Univ. of CA, Berkley, Aug. 25, 1988.

Schulze, Martin., et al., *How Reliable is a RAID?*, Proceedings of COMPCON, 1989, pp. 118-123.

Shirriff, Kenneth W., *Sawmill:A Logging File System for a High-Performance RAID Disk Array*, CSD-95-862, Jan. 1995.

Stonebraker, Michael, et al., *The Design of XPRS*, Proceedings of the 14$^{th}$ VLDB Conference, LA, CA (1988).

Tanabe, Takaya, et al, *Redundant Optical Storage System Using DVD-RAM Library*, IEEE Symposium on Mass Storage, pp. 80-87, Mar. 1999.

TEKROM—"About RAID 6".

Tweten, David, *Hiding Mass Storage Under UNIX: NASA's MSS-H Architecture*, IEEE Symposium on Mass Storage, pp. 140-145, May 1990.

Wilkes, John, et al., *The HP AutoRAID hierarchical storage system*, ACM Transactions on Computer Systems, Feb. 1996, vol. 14, pp. 108-136.

\* cited by examiner

100

| DATA DISK 0 | DATA DISK 1 | DATA DISK 2 | DATA DISK 3 | ROW PARITY DISK 4 | DIAGONAL PARITY DISK 5 |
|---|---|---|---|---|---|
| 0 | 1 | 2 | 3 | 4 | 0 |
| 1 | 2 | 3 | 4 | 0 | 1 |
| 2 | 3 | 4 | 0 | 1 | 2 |
| 3 | 4 | 0 | 1 | 2 | 3 |

FIG. 1

(PRIOR ART)

| DISK 0 DATA | DISK 1 DATA | DISK 2 DATA | DISK 3 PARITY | DISK 4 PARITY |
|---|---|---|---|---|
| 0 | 1 | 2 | (3) | 4 |
| 1 | 2 | 3 | 4 | 0 |
| 2 | 3 | 4 | 0 | 1 |
| 3 | 4 | 0 | 1 | 2 |

| DISK 0 DATA | DISK 1 PARITY | DISK 2 DATA | DISK 3 PARITY | DISK 4 DATA |
|---|---|---|---|---|
|  | 5D |  | 6R |  |
|  | 1D |  | 2R |  |
|  | 7D |  | 8R |  |
|  | 3D |  | 4R |  |

UNIFORM AND SYMMETRIC DOUBLE FAILURE CORRECTING TECHNIQUE FOR PROTECTING AGAINST TWO DISK FAILURES IN A DISK ARRAY

FIELD OF THE INVENTION

The present invention relates to failure correcting algorithms for storage systems and, more specifically, to a symmetric, double failure-correcting algorithm for protecting against two disk failures in an array.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" that comprises a cluster of physical disks, defining an overall logical arrangement of disk space. The disks within a volume are typically organized as one or more groups, wherein each group is operated as a Redundant Array of Independent (or Inexpensive) Disks (RAID). In this context, a RAID group is defined as a number of disks and an address/block space associated with those disks. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a file system to logically organize the information as a hierarchical structure of directories, files and blocks on the disks. For example, each "on-disk" file may be implemented as set of data structures, i.e., disk blocks, configured to store information, such as the actual data for the file. The storage operating system may also implement a storage module, such as a RAID system, that manages the storage and retrieval of the information to and from the disks in accordance with write and read operations. It should be noted that the RAID system may also be embodied as a RAID controller of a RAID array; accordingly, the term "RAID system" as used herein denotes a hardware, software, firmware (or combination thereof) implementation. There is typically a one-to-one mapping between the information stored on the disks in, e.g., a disk block number space, and the information organized by the file system in, e.g., volume block number space.

A common type of file system is a "write in-place" file system, an example of which is the conventional Berkeley fast file system. In a write in-place file system, the locations of the data structures, such as data blocks, on disk are typically fixed. Changes to the data blocks are made "in-place"; if an update to a file extends the quantity of data for the file, an additional data block is allocated. Another type of file system is a write-anywhere file system that does not overwrite data on disks. If a data block on disk is retrieved (read) from disk into a memory of the storage system and "dirtied" with new data, the data block is stored (written) to a new location on disk to thereby optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

Most RAID implementations enhance the reliability/integrity of data storage through the redundant writing of data "stripes" across a given number of physical disks in the RAID group, and the appropriate storing of redundant information with respect to the striped data. The redundant information, e.g., parity information, enables recovery of data lost when a disk fails. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block contains data ("data blocks"), while one block contains parity ("parity block") computed by the XOR of all the data.

If the parity blocks are all stored on one disk, thereby providing a single disk that contains all (and only) parity information, a RAID-4 level implementation is provided. The RAID-4 implementation is conceptually the simplest form of advanced RAID (i.e., more than striping and mirroring) since it fixes the position of the parity information in each RAID group. In particular, a RAID-4 implementation provides protection from single disk errors with a single additional disk, while making it easy to incrementally add data disks to a RAID group.

If the parity blocks are contained within different disks in each stripe, in a rotating pattern, then the implementation is RAID-5. Most commercial implementations that use advanced RAID techniques use RAID-5 level implementations, which distribute the parity information. A motivation for choosing a RAID-5 implementation is that, for most read-optimizing file systems, using a RAID-4 implementation would limit write throughput. Such read-optimizing file systems tend to scatter write data across many stripes in the disk array, causing the parity disks to seek for each stripe written. However, a write-anywhere file system, such as the WAFL file system, does not have this issue since it concentrates write data on a few nearby stripes.

As used herein, the term "encoding" means the computation of a redundancy value over a predetermined subset of data blocks, whereas the term "decoding" means the reconstruction of a data or parity block using a subset of data blocks and redundancy values. In RAID-4 and RAID-5, if one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks wear out and because of environmental factors with respect to the operation of the disks. In this context, the failure of two disks concurrently within a parity group is referred to as a "double failure". A double failure typically arises as a result of a failure of one disk and a subsequent failure of another disk while attempting to recover from the first failure. For example, a common source of double failure is a single failed disk combined with a single media failure (i.e., a single unreadable block in a row).

Symmetry is herein defined to mean rotational symmetry among disks of an array with respect to both the parity construction and disk reconstruction algorithms. More precisely, in an n disk array where the disks are numbered from 0 to m−1, for m>=n, re-numbering the disks by rotating them by some arbitrary amount k, such that disk j becomes disk (j+k) modulo m, does not change the parity calculations or the results of those calculations. In addition, uniformity is herein defined to mean that the same algorithm is used to compute the missing contents of a stripe, regardless of which disks are missing, and regardless of the positions of those disks in the array. If an array is uniform, it means that the algorithm used to construct redundant information or parity is the same no matter which disks in the array hold parity. It also means that the same algorithm can be used to reconstruct failed disks, regardless of what disks failed or whether they held redundant data or file system data.

A scheme incorporating a uniform algorithm allows use of all disks in the array to store data, with the parity blocks rotated or otherwise distributed among the disks to different locations in different stripes. All disks can then be used during read operations, while still achieving high-performance full and partial stripe write operations. Furthermore data structures, such as meta-data mapping files, may be configured to specify which disks contain parity and data in any particular stripe; these "maps" may be managed by the file system, separately from the RAID system, since the maps are not needed to perform reconstruction.

A typical single block row parity scheme can be used to implement a single failure-correcting scheme. All blocks in a stripe contribute equally to the invariant that the total parity of each bit position summed across all the blocks is even. It should be noted that the parity may be even or odd, as long as the parity value is known (predetermined); the following description herein is directed to the use of even parity. Therefore, during reconstruction, it is not necessary to know which blocks hold data and which hold parity. The lost block is reconstructed by summing, modulo-2, the bits in corresponding bit positions across each block. The sum is the missing block, since adding this block value to the sum of the others will produce zeros, indicating even parity for the stripe. This is true whether the missing block is a parity or data block.

To establish even parity in each stripe, one degree of freedom is needed. This is the content of the parity block, which is determined by the contents of all the data blocks. The RAID system is not free to change data block contents in a simple parity encoding, so the parity of the stripe can only be brought to the neutral even parity condition by setting the content of the single parity block.

A row-diagonal (RD) parity technique provides double failure parity correcting recovery using row and diagonal parity in a disk array. The RD parity technique may be used in an array comprising a number n of storage devices, such as disks, including a row parity disk and a diagonal parity disk, wherein n=p+1 and p is a prime number. The disks are divided into blocks and the blocks are organized into stripes, wherein each stripe comprises (n−2) rows. The diagonal parity disk stores parity information computed along diagonal parity sets ("diagonals") of the array. The diagonals are defined such that every diagonal covers all but one of the disks in the stripe.

The blocks in the stripe are organized into (n−1) diagonals, each of which contains (n−2) blocks from the data and row parity disks, and all but one of which stores its parity in a block on the diagonal parity disk. Within a stripe, a diagonal parity block does not participate in the row parity set. However, implementation of the RD parity technique requires knowledge of which parity diagonal is the missing diagonal, i.e., the diagonal for which a parity block is not computed or stored. The RD parity technique is described in U.S. patent application Ser. No. 10/035,607 titled Row-Diagonal Parity Technique for Enabling Efficient Recovery from Double Failures in a Storage Array, by Peter F. Corbett et al., filed on Dec. 28, 2001, which application is hereby incorporated by reference as though fully set forth herein.

A typical RAID-4 array or a stripe of a RAID-5 array, each having a collection of data disks and a designated row parity disk, may be configured to implement the RD parity technique. To allow implementation of the RD parity technique and, thus, reconstruction from any two disk failures in the array, the RAID-4 array or stripe of the RAID-5 array is extended through the addition of a diagonal parity disk. The number of disks in the parity set is (p+1), and the number of rows of blocks needed to complete a double disk failure tolerant group of stripes is (p−1). Of the (p+1) disks, at least two must contain parity information, and exactly one of those disks must contain the diagonal parity for the array. One or more other redundant disks contain row parity information. The remaining (p−1) or fewer disks contain data. Any number of these disks can be left out of the array. Disks that are not present are assumed to contain all zeros for the purposes of parity calculations. This allows the use of arrays having different sizes and the ability to add data disks to an existing array without recalculating parity.

Figure 1:
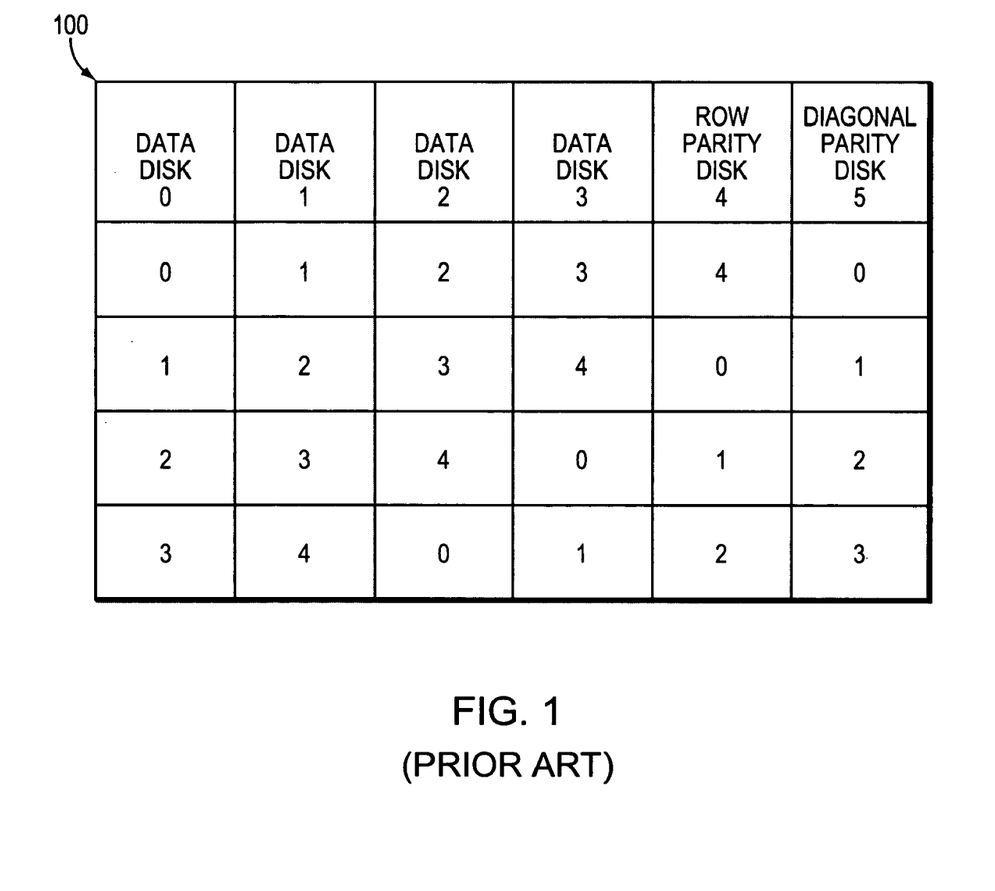
FIG. 1 is a schematic block diagram of a disk array that is configured according to a row-diagonal (RD) parity arrangement.

FIG. 1 is a schematic block diagram of a disk array 100 that is configured according to a row-diagonal (RD) parity arrangement, wherein p=5. The numbers in each position correspond to the diagonal parity set to which the block (or sub-block) belongs. The diagonal parity blocks are the modulo-2 sum of the blocks in the corresponding diagonal. The row parity blocks are the modulo-2 sum of all the data blocks in the corresponding row. In accordance with the RD parity technique, row parity is computed across all disks of a stripe, except the diagonal parity disk. The diagonal parity disk has a unique function that is not uniform or symmetric with respect to all other disks of the array, i.e., the diagonal parity disk only stores diagonal parity and does not participate in row parity calculations. The RD parity double failure-correcting technique is therefore not symmetric and the present invention is directed to providing a double failure-correcting technique that is symmetric.

An advantage of varying the locations of data and parity blocks in the array from stripe to stripe is that it may improve read performance. If all disks contain data in a uniform proportion, then the read workload will likely be balanced across all the disks. An advantage of uniformity is that there is no performance difference or algorithmic variation dependency on the positions of the redundant blocks in the stripe. Therefore, the decision of which blocks to use to store parity can be made without any bias due to the impact the choice might have on the performance of redundant data construction. This allows full flexibility in choosing which disks to hold redundant data in each stripe.

SUMMARY OF THE INVENTION

The present invention overcomes the disadvantages described herein by providing a uniform and symmetric, double failure-correcting technique that protects against two or fewer disk failures in a disk array of a storage system. A RAID system of the storage system generates two disks worth of "redundant" information for storage in the array, wherein the redundant information (e.g., parity) is illustratively derived from computations along both diagonal parity sets ("diagonals") and row parity sets ("rows"). Specifically, the RAID system computes row redundancy values along rows of the array and diagonal redundancy values along diagonals of the array. However, the contents of the redundant (parity) information disks interact such that neither disk contains purely (solely) diagonal or row redundancy information; the redundant information is generated using diagonal parity results in row parity computations (and vice versa).

In the illustrative embodiment, the disk array is a uniform and symmetric row-diagonal (SRD) parity array comprising p disks that are divided into blocks and then organized into (p−1) rows of blocks per stripe, wherein p equals a prime number greater than two, and each row contains one block from each disk. Note that while a row would typically be composed of blocks that are at the same relative position on each disk, any arbitrary construction of one or more blocks from each disk into rows can be utilized in the invention. Two of the disks are redundant (parity) disks, with each parity disk containing redundant information within parity blocks of the disk; the remaining disks are data disks configured to store data. The two disks that contain parity information do not exclusively contain row parity or diagonal parity; they contain redundant information required to ensure that the parity of each diagonal is even and the parity of each row is even. The redundant information in a parity block is uniquely determined by row parity and diagonal parity calculation contributions.

Notably, every block in the parity disks is a member of both a row and a diagonal. As a result, there is no distinction in function between the parity disks; both contain redundant information, but each of their blocks is formed from contributions of blocks on the rows and diagonals. In a more general case, any two of the disks in the SRD array can be selected as the parity disks in the array and this selection can vary from stripe to stripe arbitrarily. By reconstructing any two failed disks in the array with any selection of two parity disks, a rotationally uniform and symmetric double-failure correcting parity technique is provided.

The inventive uniform and symmetric, double failure-correcting technique allows recovery from any two or fewer disk failures in the array, including failures of data disks, parity disks or a combination of each. Moreover, the technique is rotationally symmetric and uniform; lost disks can be recovered without any knowledge of the role of the lost disk or any other disk in the array. In addition, as noted, the roles of the disks can be re-assigned from stripe to stripe arbitrarily.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 2:
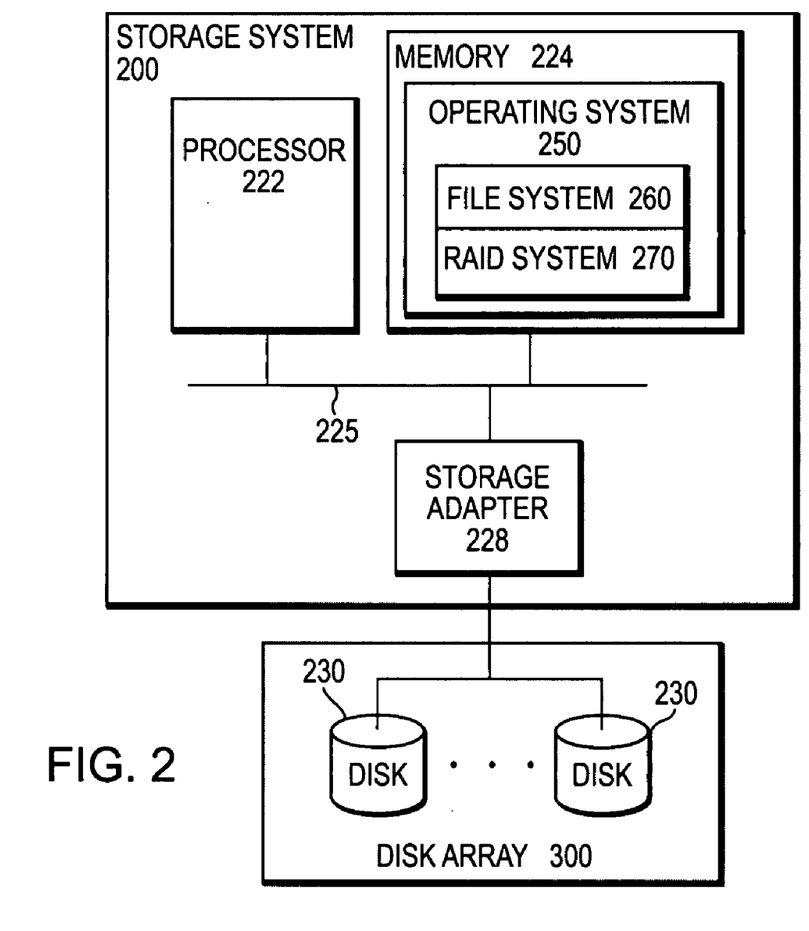
FIG. 2 is a schematic block diagram of a storage system that may be advantageously used with the present invention.

FIG. 2 is a schematic block diagram of a storage system 200 that may be advantageously used with the present invention. In the illustrative embodiment, the storage system 200 comprises a processor 222, a memory 224 and a storage adapter 228 interconnected by a system bus 225. The memory 224 comprises storage locations that are addressable by the processor and adapter for storing software program code and data structures associated with the present invention. The processor and adapter may, in turn, comprise processing elements and/or logic circuitry configured to execute the software code and manipulate the data structures. It will be apparent to those skilled in the art that other processing and memory means, including various computer readable media, may be used for storing and executing program instructions pertaining to the inventive technique described herein.

A storage operating system 250, portions of which are typically resident in memory and executed by the processing elements, functionally organizes the system 200 by, inter alia, invoking storage operations executed by the storage system. The storage operating system implements a high-level module to logically organize the information as a hierarchical structure of directories, files and blocks on disks of an array. The operating system 250 further implements a storage module that manages the storage and retrieval of the information to and from the disks in accordance with write and read operations. It should be noted that the high-level and storage modules can be implemented in software, hardware, firmware, or a combination thereof.

Specifically, the high-level module may comprise a file system 260 or other module, such as a database, that allocates storage space for itself in the disk array and that controls the layout of data on that array. In addition, the storage module may comprise a disk array control system or RAID system 270 configured to compute redundant (e.g., parity) information using a redundant storage algorithm and recover from disk failures. The disk array control system ("disk array controller") or RAID system may further compute the redundant information using algebraic and algorithmic calculations in response to the placement of fixed data on the array.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system having an on-disk format representation that is block-based using, e.g., 4 kilobyte (kB) WAFL blocks. However, it is expressly contemplated that any appropriate storage operating system including, for example, a write in-place file system may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable to perform a storage function in a storage system, e.g., that manages file semantics and may, in the case of a file server, implement file system semantics and manage data access. In this sense, the ONTAP software is an example of such a storage operating system implemented as a microkernel and including a WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

The storage adapter 228 cooperates with the storage operating system 250 executing on the system 200 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 230, such as HDD and/or DASD, of array 300. The storage adapter includes input/output (I/O) interface circuitry that couples to the disks over an I/O interconnect arrangement, such as a conventional high-performance, Fibre Channel serial link topology.

Figure 3:
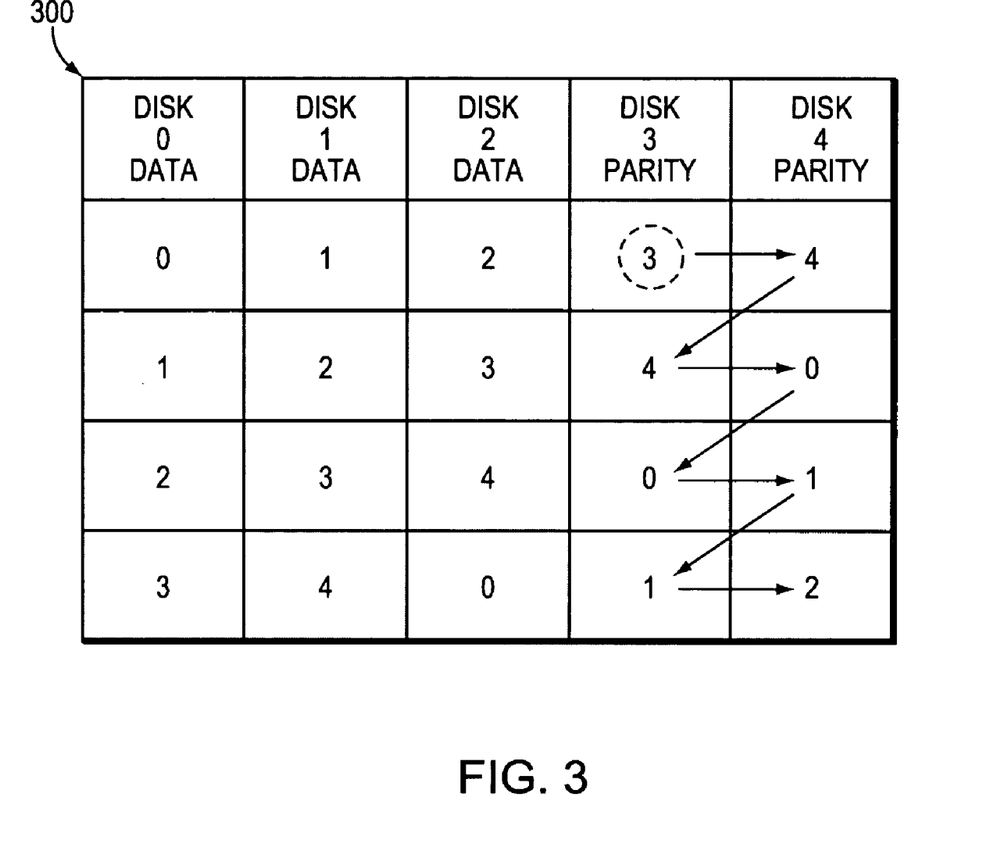
FIG. 3 is a schematic block diagram of an embodiment of a uniform and symmetric double-failure correcting parity array according to the present invention.

Storage of information on array 300 is preferably implemented as one or more storage "volumes" that comprise a cluster of physical storage disks 230, defining an overall logical arrangement of disk space. Each volume is generally, although not necessarily, associated with its own file system. The disks within a volume/file system are typically organized as one or more groups, wherein each group is operated as a RAID group. Most RAID implementations enhance the reliability/integrity of data storage through the redundant writing of data "stripes" across a given number of physical disks in the RAID group, and the appropriate storing of parity information with respect to the striped data.

According to the invention, a uniform and symmetric double failure-correcting technique is provided that protects against the failures of any two or fewer disks 230 in array 300. A RAID system, such as RAID system 270, of storage operating system 250 preferably implements the inventive technique described herein by generating two disks worth of "redundant" information for storage in the array 300. The redundant information may be generated through summation or combination computation techniques along row parity sets ("rows") and diagonal parity sets ("diagonals") of the array. The combination techniques may include, for example, a linear combining algorithm adapted to operate by addition over bit fields that are one or more bits wide. The redundant information can be concentrated on two disks or distributed across any or all of the disks in the array.

However, in the illustrative embodiment, the redundant information (e.g., parity) is illustratively derived from computations along both diagonals and rows. Specifically, the RAID system computes row redundancy values along rows of the array and diagonal redundancy values along diagonals of the array. Notably, the contents of the redundant (parity) information disks interact such that neither disk contains purely (solely) diagonal or row redundancy information; the redundant information is generated using diagonal parity results in row parity computations (and vice versa). An example of a symmetric parity algorithm contemplated by the symmetric double failure-correcting technique is uniform and symmetric row-diagonal (RD) parity.

Uniform and Symmetric RD Parity

Uniform and symmetric RD (SRD) parity takes an array of p storage devices, such as disks, where p is a prime number greater than two. The disks are divided into blocks, illustratively of fixed size. A row is defined to be a set of uniquely selected blocks, one from each disk, and a stripe is defined to be a uniquely selected group of rows. Typically a row consists of blocks at the same position on each disk and a stripe is a group of contiguous rows.

The block size for SRD does not have to correspond to the block size used by the file system on disk. A file system block may be composed from multiple SRD blocks. In one implementation, adjacent sets of p−1 rows are grouped into stripes using p−1 SRD blocks to compose one file system block. Since file system blocks are typically a power of two, such as 4 k bytes, then selecting p such that p−1 is also a power of two allows a full stripe's worth of SRD blocks to fit into a single stripe of file system blocks that is one file system block deep. For example, if the SRD block size is 16 bytes then, with p=257, 256 SRD blocks can fit into a 4 k byte file system block. Therefore, an entire self-contained set of SRD rows and diagonals can be constructed inside one stripe of 4 k file system blocks, one 4 k block from each disk.

Broadly stated, all blocks of a SRD parity array are members of a row and a diagonal. A diagonal is defined within a group of arbitrarily, but uniquely selected rows. A diagonal may be formed, for example, by numbering the data and redundant (parity) disks from 0 to p−1, numbering the rows within the selected group of p−1 rows from 0 to p−2, and then assigning the block at device i, row j to diagonal (i+j) modulo p. This creates an arrangement whereby each diagonal excludes all blocks from one disk and no two diagonals exclude all blocks from the same disk. Note that the term "diagonal" includes simple alternate patterns that are not literally diagonals.

A "chain" is defined as a series of blocks, such that all blocks in the chain belong to one of two disks, and the two blocks at either end of the chain are on different disks and are in the same row as their nearest neighbor blocks on the chain. Moreover, all other blocks on the chain are in the same row as one other block in the chain and in the same diagonal as one other block in the chain.

The SRD technique can be implemented within a group of p−1 arbitrarily constructed and selected rows containing up to p devices by the assignment of blocks to diagonals. While a simple assignment of blocks to diagonals is described, it is sufficient to ensure that each diagonal contains no more than one block from each row, contains one block from each disk but one, and that between any two disks, there is just one chain connecting all the blocks in the selected rows on those two disks. The simple assignment defines diagonal d to be all the blocks (i, j), where i is the disk number of the block and j is the row number of the block within a set of p−1 rows, such that d=(i+j) modulo p. An alternative assignment of blocks to diagonals that also satisfies the sufficient condition for SRD to work is, for example, d=(i−j) modulo p. In general, a set of diagonals can be defined that satisfies the equation d=(i+kj) modulo p, for some fixed integer value of k, wherein k≠0 and −p<k<p.

Any two disks in each stripe can contain redundant (parity) information. For any selection of parity disks, it is provable that there is one unique assignment of parity values that brings all rows and diagonals into even parity. As described herein, the unique assignment is determined first by setting diagonal parity on two diagonals that are missing just one block, then tow parity on those two rows, etc. Note also that the same algorithm can be used to reconstruct any two lost disks after a double failure, while row parity can be used to reconstruct any single lost disk.

FIG. 3 is a schematic block diagram of an embodiment of a uniform and symmetric double-failure correcting parity array according to the present invention. The uniform and symmetric parity array is illustratively an SRD parity array 300 that may be created by eliminating a data disk from the RD parity array 100 and by extending row parity computations to cover the diagonals. The SRD array comprises p disks that are divided into blocks and then organized into (p−1) rows per stripe, wherein p equals a prime number greater than two, e.g., 5, 17, 257, so that the number of rows (p−1) equals a power of two to thereby allow inclusion in one stripe. The labels in each block identify the diagonal to which the block belongs.

In the illustrative embodiment, the p disks of the SRD parity array 300 include data disks configured to store data and two redundant (parity) disks, each parity disk containing redundant information within parity blocks of the disk. As noted, the two disks that contain parity information do not exclusively contain row parity or diagonal parity; they contain redundant information required to ensure that the parity of each diagonal is even and the parity of each row is even. The redundant information in a parity block is uniquely determined by row parity and diagonal parity calculation contributions.

Referring also to FIG. 1, disk 3 of array 300 contains the former row parity, disk 4 contains the former diagonal parity, disk 0 has been removed from the array, all disks have been renumbered by d=d−1, and all blocks have been renumbered by j=(j−1) modulo p to restore the zero based numbering. Notably, every block in disks 3 and 4 of array 300 is a member of both a row and a diagonal. As a result, there is no distinction in function between disks 3 and 4; both contain redundant information, but each of their blocks is formed from contributions of blocks on the rows and diagonals. In a more general case, any two of the disks can be selected as the parity disks in the array and this selection can vary from stripe to stripe arbitrarily. This results in two parity disks and (p−2) data disks in the general case. By reconstructing any two lost (failed) disks in the array with any selection of two parity disks, a rotationally uniform and symmetric double-failure correcting parity technique is provided. The parity calculations are a function purely of the relative positions of the disks in the array. In an n disk array, with the disks numbered from 0 to n−1, rotating the numbering of the disks such that disk j becomes disk (j+k) modulo n for any value of k, does not affect either the parity calculations or their results.

The SRD algorithm that is used for construction of parity and for reconstruction of two failed blocks alternates between the following two steps until all blocks are constructed: (i) construct two blocks based on diagonal parity in the two diagonal parity sets that are only missing one member, and (ii) reconstruct two blocks using row parity in row parity sets that now are missing only one member. This algorithm is uniform in that it applies no matter which disks are being constructed or reconstructed.

If rows are defined in the conventional way, i.e., each row consisting of one block from the same position on each disk, and if diagonals are defined so that the blocks belonging to diagonal d satisfy the equation d=(i+kj) modulo p, wherein k ≠0 and −p<k<p, then the array is also rotationally symmetric, which means that the disks can be renumbered by rotating them in the array, and achieve the exact same parity computations and results.

Reconstruction Using SRD Parity

The novel SRD parity array is symmetric because every row, as well as every diagonal, adds (for example, via XOR operations) to zero. Therefore, any two disks within a stripe can be chosen as the parity disks. A property of uniformity is that reconstruction from double failures, as well as construction, of the array is achieved using the same double-failure correcting algorithm. Moreover, another property of uniformity is that the same reconstruction algorithm can be used regardless of which disks fail. Reconstruction can occur without knowing the roles of the failed disks, i.e., it does not matter whether the failed disks contain data or parity.

Reconstruction after a double failure begins by reconstructing a diagonal first because there are always two sub-blocks (hereinafter generally referred to as "blocks") lost from every row. For example, assume the parity disks (disks 3, 4) of the SRD array 300 fail. Diagonal parity set 3 does not include any block of disk 4 and, as a result, has only one missing block (dotted disk block 3 in disk 3). Therefore, lost disk block 3 on diagonal 3 can be immediately reconstructed using diagonal parity computations. It should be noted that only one block is lost from diagonal parity set 2 also, as that diagonal parity set does not hit disk 3. Reconstruction can thus alternatively begin with diagonal block 2 on disk 4 using diagonal parity computations along diagonal parity set 2. Note further that both of these diagonal blocks can be reconstructed in parallel; essentially, reconstruction can begin at either or both ends of the chain of missing blocks.

Assume reconstruction commences with diagonal parity block 3 in disk 3. Once that diagonal parity block is reconstructed, the adjacent missing parity block in the row (block 4 in disk 4) can be constructed utilizing row parity computations. Once that is achieved, the diagonal block corresponding to the diagonal parity set of the reconstructed adjacent missing block (block 4 in disk 3) can be reconstructed using diagonal parity, followed by reconstruction of the adjacent missing block (block 0 in disk 4) using row parity. Reconstruction in this row-diagonal parity "zig-zag" manner continues until all missing blocks of the failed disks are reconstructed.

As another example (not shown in FIG. 3), assume data disk 1 and parity disk 3 of SRD array 300 fail. Diagonal parity set 0 is missing from data disk 1, so reconstruction can begin with diagonal block 0 in parity disk 3. That is, diagonal block 0 in disk 3 can be reconstructed utilizing diagonal parity along the diagonal parity set 0. Thereafter, diagonal parity block 3 in data disk 1 can be reconstructed utilizing row parity (since diagonal parity block 3 is on the same row as reconstructed diagonal parity block 0). Then, diagonal parity block 3 in disk 3 can be reconstructed utilizing diagonal parity, followed by reconstruction of diagonal block 1 in disk 1 utilizing row parity. This process continues until all blocks on both disks are reconstructed.

Since there is a distance of two between the failed disks, the reconstruction process jumps from every other row (a separation of two rows) to thereby cover all rows of the stripe. This is the reason for requiring a prime number p equal to the number of disks and (p–1) equal to the number of rows per stripe: to ensure that every row is encountered and reconstructed during reconstruction regardless of the distance between the failed disks. In other words, the diagonal parity sets can span distances of one row, two rows, and so on up to n divided by 2 (where n equals the number of disks), wherein all of the distances are not a factor of the prime numbers. Moreover, the SRD algorithm incorporates modulo arithmetic so it "wraps around" the array in a manner that conceptually utilizes a missing (e.g., $5^{th}$) row for calculation of displacement (between rows).

Figure 4:
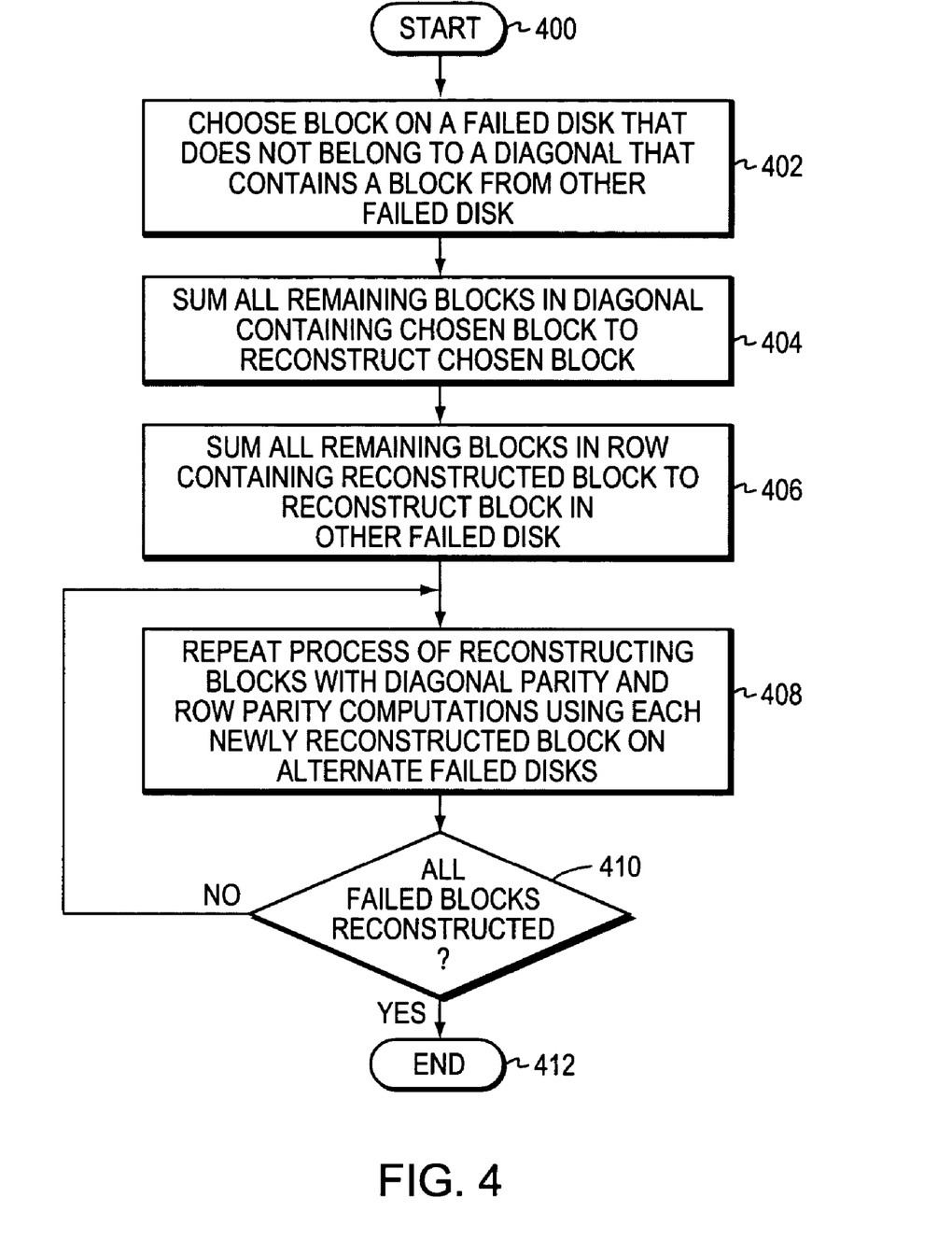
FIG. 4 is a flowchart illustrating a sequence of steps pertaining to a reconstruction process that reconstructs data lost in response to two disk failures in the uniform and symmetric double-failure correcting parity array of the present invention.

FIG. 4 is a flowchart illustrating a sequence of steps pertaining to a reconstruction process that reconstructs data lost in response to two disk failures in the uniform and symmetric double-failure correcting parity array of the present invention. The reconstruction process is illustratively performed by the RAID system 270 using the novel SRD parity technique. The sequence starts at Step 400 and proceeds to Step 402 where the RAID system chooses a block on one of the failed disks that does not belong to a diagonal parity set (diagonal) that contains a block from the other failed disk. In Step 404, the system sums (XOR) all remaining blocks in the diagonal containing the chosen block to reconstruct the chosen, failed block. In Step 406, the system sums (XOR) all remaining blocks in the row containing the reconstructed block to reconstruct the block in the other failed disk. In Step 408, the process of reconstructing blocks with diagonal and then row parity computations using each newly reconstructed block on alternate failed disks repeats (in the above-described "zig-zag" manner). In Step 410, a determination is made as to whether all the failed blocks have been reconstructed. If not, the sequence returns to Step 408. Otherwise, the sequence then ends at Step 412. As a result, the RAID system can reconstruct the data of any two failed disks without knowledge of which disks contain parity.

Referring again to FIG. 3, the SRD parity array 300 has a missing diagonal associated with each disk; that is important to enabling recovery from two disk failures. However, because the SRD array is symmetrical, every diagonal has its parity computed; this is different from the RD parity technique. That is, the RD parity algorithm has the property that there is one diagonal that does not have XOR computations associated therewith. In the novel SRD algorithm, however, XOR computations are performed along all diagonals to enable reconstruction and construction of the array. Therefore, construction in the SRD array is similar to the reconstruction example described above.

Computing SRD Parity

The above-described SRD parity technique can properly represent parity for any arbitrary value, while enabling recovery of the array from any loss of two disks. Because of its uniform properties, the same double failure-correcting parity algorithm can be used for recovery and construction. Broadly stated, construction involves an initial computation of partial sums of the data blocks on each row and diagonal. On each parity disk, one of the blocks is the only remaining block on a diagonal. Therefore, these two blocks can be set directly to the value of the corresponding diagonal partial sum, to "even" the parity of those two diagonals. This leaves a single unresolved block on each of those two rows, which can be set to the partial sum of the data blocks on the row, plus the parity value set in the parity block in the row. Next, the nearly completed diagonals may be finalized by setting two more parity blocks. This process continues until all remaining parity blocks are set. Each parity block other than the first two requires one additional XOR operation to sum the partial row or diagonal parity with the computed parity of the other parity block on the row or diagonal.

Figure 5:
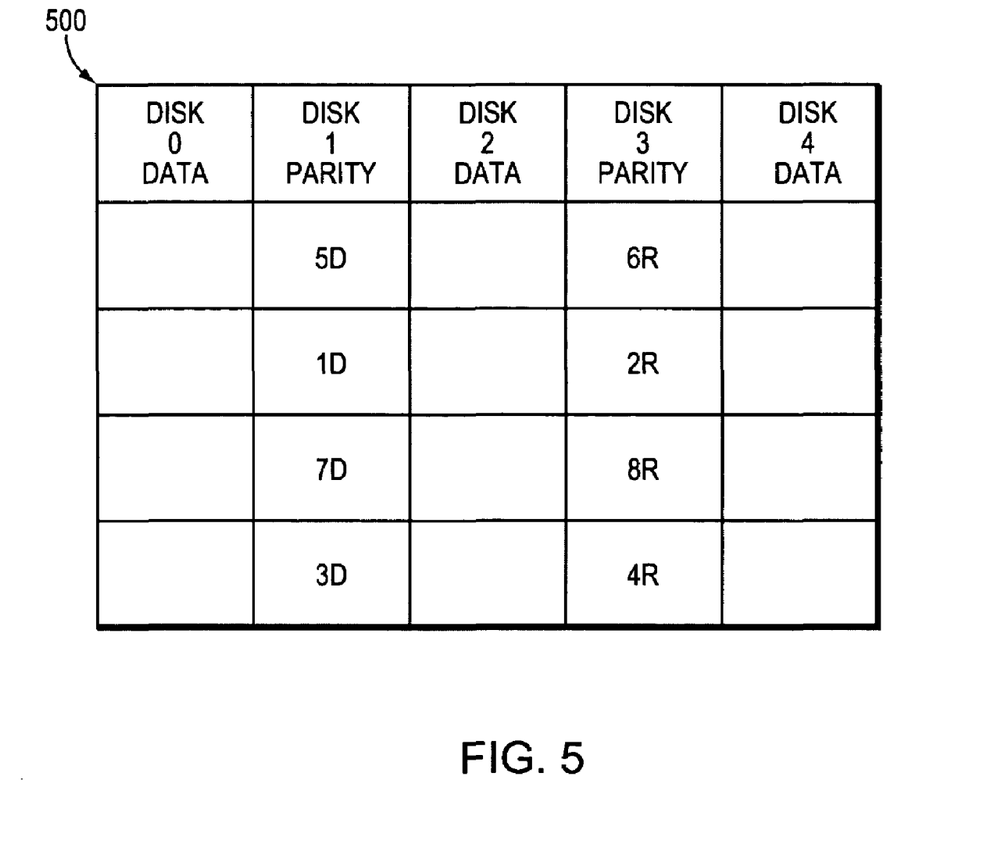
FIG. 5 is a schematic block diagram of another embodiment of the uniform and symmetric double-failure correcting parity array according to the present invention.

FIG. 5 is a schematic block diagram of another embodiment of the uniform and symmetric double-failure correcting parity array according to the present invention. This embodiment is illustratively an SRD parity array 500 comprising p disks and (p–1) rows per stripe, wherein p equals a prime number greater than two, e.g., 5, and wherein disks 1 and 3 are the parity disks. The non-zero numbers in the blocks correspond to the sequence in which the bits in those blocks might be set, as well as the type of parity, e.g., row (R) or diagonal (D), used to compute the bits, according to the inventive technique.

Since each block is a member of one row and one diagonal, changing the value of an arbitrary data block requires that the parity value stored in at least one parity block on the same diagonal be changed. A diagonal parity block is selected that completes the cycle back to the row of the changed data block through a series of alternate changes to row and diagonal parity blocks on the two parity disks. Once the same delta change is applied to a parity block in the same row as the original data block that was modified, even parity is restored throughout the array. It is always possible to form such a cycle, regardless of the data block changed or which two disks are selected to store parity.

Note that an array filled with zeros has even parity in each row and diagonal: all rows and all diagonals add to zero since there is nothing other than zero stored in any block of the array. Since the XOR operation used to compute parity is commutative and associative, all the contributions from all the data blocks to the two parity disks can be summed together (superimposed) to keep the array in even parity.

This property can apply to a situation where not all p disks are present in array 500, with the missing disks' contents imputed to have predetermined and fixed values, e.g., all zeros. Moreover, the property may apply to adding a disk initialized to a predetermined and fixed value, e.g., a zeroed disk, to the array 500 and arbitrarily designating its blocks to contain either data or parity, while retaining the further property that each stripe has two parity blocks.

Note also that the participation of blocks in parity sets is rotationally symmetric in the array 500. Any two disks can be selected as the redundant disks, and that selection may vary from row to row. Constructing parity during normal full stripe writing operations, and reconstructing from two lost disks, require exactly the same algorithm and can use the same computer instruction code.

Figure 6:
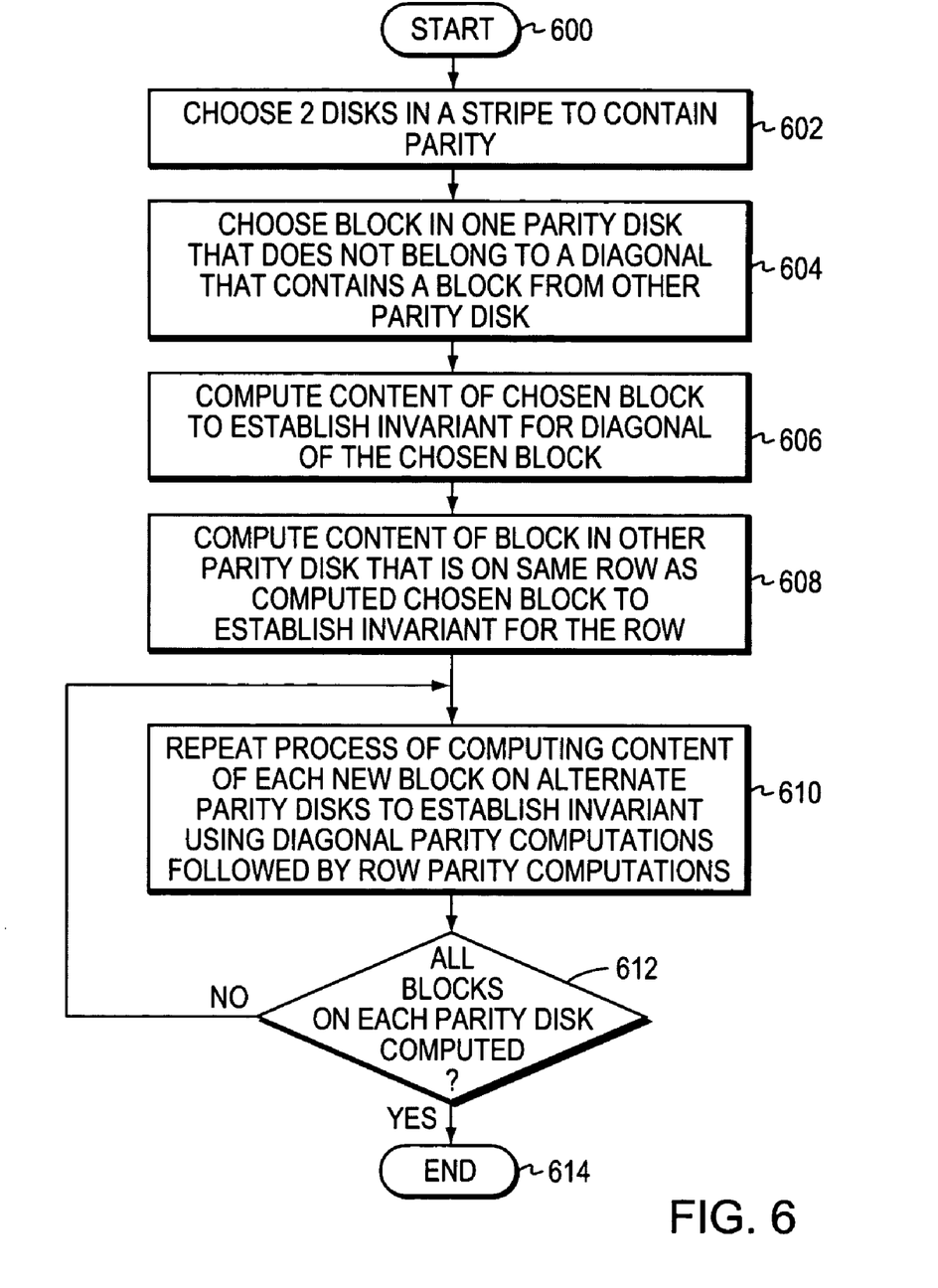
FIG. 6 is a flowchart illustrating a sequence of steps pertaining to a construction process that computes data in the uniform and symmetric double-failure correcting parity array of the present invention.

FIG. 6 is a flowchart illustrating a sequence of steps pertaining to a construction process that computes data in the uniform and symmetric double-failure correcting parity array of the present invention. The construction process is illustratively performed by the RAID system 270 using the novel SRD parity technique. The sequence starts at Step 600 and proceeds to Step 602 where the RAID system chooses two disks in a stripe to contain parity information. In Step 604, the system chooses a block in one of the parity disks that does not belong to a diagonal parity set (diagonal) that contains a block from the other parity disk. In Step 606, the RAID system computes the content of the chosen block needed to establish an invariant (e.g., zero parity) for the block's diagonal and stores the computed content in the chosen block.

In Step 608, the system computes the content of a block in the other parity disk that is on the same row as the previously computed chosen block to establish the parity invariant for that row and stores the computed content in the block. In Step 610, the process of computing the content of each new block on alternate parity disks to establish the parity invariant using, e.g., diagonal parity followed by row parity computations, repeats (in the "zig-zag" manner). Note that each iteration starts with a block on the one parity disk that is on the same diagonal as the last computed row parity block. In Step 612, a determination is made as to whether all blocks on each parity disk are computed. If not, the sequence returns to Step 610. Otherwise, the sequence then ends at Step 614.

An area where the uniform and symmetric double failure-correcting technique differs from RD parity is in recovery from single disk failures. In the novel technique, since row parity covers all disks, a lost disk can always be recovered using row parity. In RD parity, the diagonal parity disk is not covered by row parity. Therefore, recovery of the diagonal parity disk is achieved by re-computing diagonal parity. Note that the uniform and symmetric technique may be simpler to implement than the RD parity technique, as it does not require a special case for the lost diagonal parity disk.

Two disks is the minimum redundancy needed to allow recovery from two disk failures; therefore, the uniform and symmetric double failure-correcting technique described herein is optimal in the amount of redundant (parity) information stored. Any of the disks within the uniform and symmetric double failure-correcting array can be used to store redundant information within a stripe, since the uniform and symmetric parity algorithm (e.g., the SRD algorithm) can recover from any two or fewer disk failures in the array. Any two disks can be selected to store redundant information and all the remaining disks store data. As a result, the SRD algorithm incorporates all properties of uniformity so that the algorithm can advantageously apply to various parity distribution techniques such as, e.g., dynamic and/or semi-static distribution described in U.S. patent application Ser. No. 10/700,227 titled Dynamic Parity Distribution Technique and U.S. patent application Ser. No. 10/720,364 titled Semi-Static Distribution Technique, respectively.

A feature of the present invention involves the uniform nature of the double failure-correcting (SRD) parity technique/algorithm, wherein uniformity is defined as the roles of the disks in terms of invariants for the redundant (XOR) computations being irrelevant to the computations. When examining the disk array, there is no way of knowing (based on values stored on the disks) what the roles of any disks are for any given stripe. All that can be determined is that all the blocks in a row add to zero and, in the case of a diagonal parity set, all the blocks of the rows and diagonals add to zero.

Since the same parity construction algorithm is used for any selection of parity disks, the performance of parity construction is uniform regardless of the disks selected to store parity in a particular stripe. This is not the case if an algorithm lacking the uniform property is employed, storing "data" in some of the "parity" blocks, and using that algorithm's "reconstruction" method to construct the redundant blocks, which act as data blocks from the standpoint of the algorithm. While such a technique is possible, and can be applied using any failure-correcting algorithm, it is not likely to provide uniform performance when constructing the redundant information on different disks in different stripes. The uniform algorithm has the advantage of providing even performance no matter which disks are selected to store parity, and as a result does not bias the selection of the parity disks to any particular disks based on the algorithmic roles of those disks. Another advantage of the invention (particularly when applied to the semi-static distribution technique) is that the role of a block can be reassigned without moving data to balance the loads or add a disk to the array. Dynamic distribution of parity denotes arbitrarily writing (placing) parity in any block anywhere in the array.

While there has been shown and described illustrative embodiments of a uniform and symmetric, double failure-correcting technique for protecting against two disk failures in an array, it is to be understood that various other adaptations and modifications may be made within the spirit and scope of the invention. For example, in an alternate embodiment, the present invention can be used in the area of communications as a forward error correction technique that enables, e.g., multicast distribution of data over long latency links (e.g., satellite). In this embodiment, the data and redundant information may be divided into elements, such as packets or units of information, adapted for transmission over an electronic communications medium (network).

It will further be understood to those skilled in the art that the inventive uniform and symmetric failure correcting technique described herein may apply to any type of special-purpose (e.g., file server, filer or multi-protocol storage appliance) or general-purpose computer, including a standalone computer or portion thereof, embodied as or including a storage system 200. An example of a multi-protocol storage appliance that may be advantageously used with the present invention is described in U.S. patent application Ser. No. 10/215,917 titled, Multi-Protocol Storage Appliance that provides Integrated Support for File and Block Access Protocols, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

The foregoing description has been directed to specific embodiments of this invention. It will be apparent, however, that other variations and modifications may be made to the described embodiments, with the attainment of some or all of their advantages. For instance, the present invention can apply to a storage system having an array with two or more RAID groups, one or more of which employs the uniform and symmetric double failure-correcting technique to protect against two or fewer failures within any one of those RAID groups, wherein each RAID group comprises p disks with p equal to a prime greater than two and wherein the value of p may vary among the groups. In addition, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to provide double failure-correction of two or fewer storage device failures in a storage system, the system comprising:
    an array having a number of storage devices, wherein the number of storage devices is p and wherein p is a prime number greater than two, wherein the storage devices have a storage space divided into stripes and wherein any two storage devices are selected to store redundant information, the selected storage devices varying arbitrarily from stripe to stripe, and the remaining storage devices of each stripe configured to store data; and
    a storage module of the storage system, the storage module adapted to construct the redundant information using a redundant storage algorithm involving summation or combination computation along row parity sets (rows) and diagonal parity sets (diagonals) of the array for storage on the selected storage devices,
    wherein the redundant storage algorithm used to construct the two or fewer storage device failures is the same regardless of which storage devices fail or roles of the storage devices when constructing or reconstructing the redundant information or data.

2. The system of claim 1 wherein the redundant information is constructed along both diagonals and rows for storage on the selected storage devices, such that neither selected storage device contains solely diagonal or row redundancy information.

3. The system of claim 2 wherein the redundant information stored on the selected storage devices interacts such that the redundant information is uniquely determined by row parity and diagonal parity computation contributions.

4. The system of claim 1 wherein the storage module is a disk array controller.

5. The system of claim 1 wherein the storage module is a RAID system.

6. The system of claim 5 wherein the rows and diagonals are combined using a linear combining algorithm over bit fields that are one or more bits wide.

7. The system of claim 6 wherein the redundant information ensures that each diagonal and each row have known parity values.

8. The system of claim 6 wherein the roles of the storage devices in the array are irrelevant with respect to computation of contents of any two failed storage devices.

9. The system of claim 8 wherein the storage devices are one of video tape, magnetic tape, optical, DVD, bubble memory, magnetic disk, electronic random access memory and micro-electro mechanical storage devices.

10. The system of claim 8 wherein the storage devices are media adapted to store information contained within data and parity blocks.

11. The system of claim 10 wherein the array has two or more RAID groups, one or more RAID groups employing the redundant storage algorithm to protect against two or fewer failures within any one of the RAID groups, wherein each RAID group comprises p storage devices with p equal to a prime greater than two and wherein a value of p may vary among the groups.

12. The system of claim 11 wherein not all p storage devices are present in the array and wherein contents of the storage devices not present have predetermined and fixed values.

13. The system of claim 1 wherein not all p storage devices are present in the array and wherein contents of the storage devices not present have predetermined and fixed values.

14. A system configured to provide double failure-correction of two or fewer storage device failures in a storage system, the system comprising:
    an array having a number of storage devices, wherein the number of storage devices is p and wherein p is a prime number greater than two, the storage devices including two storage devices selected to store redundant information, the remaining storage devices configured to store data; and
    a storage module of the storage system, the storage module adapted to construct the redundant information using a redundant storage algorithm involving summation or combination computation along row parity sets (rows) and diagonal parity sets (diagonals) of the array for storage on the selected storage devices, the storage module further adapted to use the redundant storage algorithm to reconstruct the two or fewer storage device failures,
    wherein the storage devices have a storage space divided into stripes with any two storage devices selected to store the redundant information, the selected storage devices varying from stripe to stripe, arbitrarily, and wherein the two or fewer storage device failures are recovered without any knowledge of roles of those devices or any other storage device in the array.

15. The system of claim 14 wherein the redundant information is constructed along both diagonals and rows for storage on the selected storage devices, such that neither selected storage device contains solely diagonal or row redundancy information.

16. The system of claim 15 wherein the redundant information stored on the selected storage devices interacts such that the redundant information is uniquely determined by row parity and diagonal parity computation contributions.

17. The system of claim 14 wherein the storage module is a disk array controller.

18. The system of claim 14 wherein the storage module is a RAID system.

19. The system of claim 18 wherein the rows and diagonals are combined using a linear combining algorithm over bit fields that are one or more bits wide and wherein the redundant information ensures that each diagonal and each row have known parity values.

20. The system of claim 19 wherein the array is a symmetric row-diagonal (SRD) parity array.

21. The system of claim 19 wherein the roles of the storage devices in the array are irrelevant with respect to computation of contents of any two failed storage devices.

22. The system of claim 21 wherein the storage devices are one of video tape, magnetic tape, optical, DVD, bubble memory, magnetic disk, electronic random access memory and micro-electro mechanical storage devices.

23. The system of claim 21 wherein the storage devices are media adapted to store information contained within data and parity blocks.

24. The system of claim 23 wherein the array has two or more RAID) groups, one or more RAID groups employing the redundant storage algorithm to protect against two or fewer failures within any one of the RAID groups, wherein each RAID group comprises p storage devices with p equal to a prime greater than two and wherein a value of p may vary among the groups.

25. The system of claim 24 wherein not all p storage devices are present in the array and wherein contents of the storage devices not present are zero.

26. The system of claim 14 wherein not all p storage devices are present in the array and wherein contents of the storage devices not present have predetermined and fixed values.

27. A method for protecting against two or fewer disk failures in a storage system, the method comprising the steps of:
proviing an array with a number of disks, wherein the number of disks is p and wherein p is a prime number greater than two;
dividing each disk into blocks;
organizing the blocks into stripes that contain a same number of blocks in each disk, wherein each stripe comprises p–1 rows of blocks;
computing the redundant information through summation or combination computation along row parity sets (rows) and diagonal parity sets (diagonals) of the array;
arbitrarily assigning the roles of the blocks to thereby allow balancing of data loads across the array, where any two disks of each stripe are selected to store redundant information; and
storing the computed redundant information on the selected disks.

28. The method of claim 27 wherein the step of computing comprises the step of computing the redundant information along both diagonals and rows for storage on the selected storage devices, such that neither selected storage device contains solely diagonal or row redundancy information.

29. The method of claim 28 wherein the step of computing further comprises the step of computing row parity along rows of the array and diagonal parity along diagonals of the array, such that the redundant information ensures that each diagonal and each row have known parity values.

30. The method of claim 29 wherein the step of computing further comprises the step of computing the redundant information using exclusive-OR logical operation computations.

31. The method of claim 30 wherein roles of the disks in the array are irrelevant with respect to computation of contents of any two failed storage devices.

32. The method of claim 27 wherein the step of computing further comprises the step of computing by addition over bit fields that are one or more bits wide.

33. The method of claim 27 further comprising the step of reassigning the role of a block without moving data to balance the data loads or add a disk to the array.

34. The method of claim 27 further comprising the step of constructing the rows from one or more blocks from each disk, arbitrarily.

35. The method of claim 27 further comprising the step of combining the rows of blocks to form a single stripe of larger blocks when p–1 is a power of two.

36. The method of claim 27 further comprising the steps of:
adding an initialized disk to the array; and
designating blocks on the initialized disk to contain data or redundant information, while ensuring that two blocks store redundant information in each stripe.

37. The method of claim 36 wherein contents of the initialized disk match imputed contents of a missing disk, such that the redundant information in the array does not need recalculation.

38. The method of claim 37 wherein the contents of the initialized disk are zero.

39. The method of claim 27 further comprising the step of, wherein the disks have a disk space divided into stripes, selecting any two disks to store the redundant information, the selected disks varying from stripe to stripe, arbitrarily.

40. The method of claim 28 further comprising the step of, wherein the disks are numbered from 0 to m–1, for m>=p, renumbering the disks by rotating the disks by amount k, such that disk j becomes disk (f+k) modulo m, does not change the computations to compute the redundant information or the results of the computations.

41. A system configured to provide double failure-correction of two or fewer storage device failures in a storage system, the system comprising:
an array having a number of storage devices, wherein the number of storage devices is p and wherein p is a prime number greater than two; and
a storage module of the storage system, the storage module adapted to construct redundant information using a redundant storage algorithm involving summation or combination computation along row parity sets (rows) and diagonal parity sets (diagonals) of the array for storage on the selected storage devices, the storage module further adapted to use the redundant storage algorithm to reconstruct the two or fewer storage device failures, regardless of which storage devices fail or whether the storage devices store redundant information or data,
wherein the storage devices have a storage space divided into stripes with any two storage devices selected to store the redundant information, the selected storage devices varying from stripe to stripe, arbitrarily, and wherein the two or fewer storage device failures are recovered without any knowledge of roles of those devices or any other storage device in the array.

42. The system of claim 41 wherein the redundant information is constructed along both diagonals and rows for storage on the selected storage devices, such that neither selected storage device contains solely diagonal or row redundancy information.

43. The system of claim 42 wherein the redundant information stored on the selected storage devices interacts such that the redundant information is uniquely determined by row parity and diagonal parity computation contributions.

44. The system of claim 42 wherein each storage device is divided into blocks, the blocks are organized into stripes that contain a same number of blocks in each disk.

45. The system of claim 44 wherein each diagonal d=(i+j) modulo p, wherein i is a disk number of a block and j is a row number of the block within a set of p−1 rows.

46. The system of claim 44 wherein each diagonal d=(i−j) modulo p, wherein i is a disk number of a block and j is a row number of the block within a set of p−1 rows.

47. The system of claim 44 wherein each diagonal d=(i+k) modulo p, wherein i is a disk number of a block, j is a row number of the block within a set of p−1 rows and k is a fixed integer, and wherein k≠0 and −p<k<p.

48. The system of claim 44 wherein a series of blocks is organized as a chain, such that all blocks in the chain belong to two storage devices, and two blocks at either end of the chain are on different storage devices and are in the same row as nearest neighboring blocks on the chain, and wherein all other blocks in the chain are in the same row as one other block in the chain and in the same diagonal as one other block in the chain.

49. The system of claim 41 wherein the storage module is a disk array controller.

50. The system of claim 41 wherein the storage module is a RAID system.

51. The system of claim 50 wherein the rows and diagonals are combined using a linear combining algorithm over bit fields that are one or more bits wide and wherein the redundant information ensures that each diagonal and each row have known parity values.

52. The system of claim 51 wherein the array is a uniform and symmetric row-diagonal (SRD) parity array.

53. The system of claim 51 wherein the roles of the storage devices in the array are irrelevant with respect to computation of contents of any two failed storage devices.

54. The system of claim 53 wherein the storage devices are one of video tape, magnetic tape, optical, DVD, bubble memory, magnetic disk, electronic random access memory and micro-electro mechanical storage devices.

55. The system of claim 53 wherein the storage devices are media adapted to store information contained within data and parity blocks.

56. The system of claim 55 wherein the array has two or more RAID groups, one or more RAID groups employing the redundant storage algorithm to protect against two or fewer failures within any one of the RAID groups, wherein each RAID group comprises p storage devices with p equal to a prime greater than two and wherein a value of p may vary among the groups.

57. The system of claim 56 wherein not all p storage devices are present in the array and wherein contents of the storage devices not present are zero.

58. The system of claim 41 wherein not all p storage devices are present in the array and wherein contents of the storage devices not present have predetermined and fixed values.

59. Apparatus for protecting against two or fewer disk failures in a storage system, the apparatus comprising:
   means for providing an array with a number of disks, wherein the number of disks is p and wherein p is a prime number greater then two;
   means for dividing each disk into blocks;
   means for organizing the blocks into stripes that contain a same number of blocks in each disk, wherein each stripe comprises p−1 rows of blocks;
   means for computing the redundant information from both diagonal and row parity computation contributions;
   means for arbitrarily assigning the roles of the blocks to thereby allow balancing of data loads across the array, where any two disks of each stripe are selected to store redundant information and the two disks selected vary from stripe to stripe; and
   means for storing the computed redundant information on the selected disks, such that neither selected disk contains solely diagonal or row parity information.

60. A method for correcting double failures within data adapted for transmission over a communication medium, the method comprising the steps of:
   dividing the data into packets for transmission over the communications medium;
   organizing the packets into one or more groups adapted to employ a uniform and symmetric double failure-correcting algorithm to protect against two or fewer failures of packets within any one of the groups, wherein each group comprises p packets with p equal to a prime greater than two and wherein a value of p may vary among the groups, and wherein two packets of each group are selected to store redundant information, the remaining packets of the group configured to store data;
   computing the redundant information through summation or combination computation along row parity sets (rows) and diagonal parity sets (diagonals) of the group; and
   storing the computed redundant information in the selected packets.

61. A method for protecting against two or fewer disk failures in a storage system, comprising:
   providing an array with a number of disks, wherein the number of disks is p and wherein p is a prime number greater than two;
   dividing each disk into blocks;
   organizing the blocks into stripes that contain a same number of blocks in each disk, wherein each stripe comprises p−1 rows of blocks
   choosing any two disks of the array, a first parity disk and a second parity disk, in a stripe to contain parity, arbitrarily;
   choosing a first block in either of the first parity disk or the second parity disk, where the first block does not belong to a diagonal that contains a second block in remaining parity disk;
   computing diagonal parity for the first block; and
   computing row parity for a row block on remaining parity disk, where the row block and the first block are in a same row.

62. The method of claim 61, further comprising:
   computing remaining parity blocks in the stripe by alternating diagonal computation followed by row computation.

63. The method of claim 61, wherein the two disks selected to store parity change after each stripe.

64. The method of claim 61, wherein neither of the two disks selected to store parity contain solely diagonal or row parity.

* * * * *